Oct. 19, 1954
W. J. B. BROWN
2,691,842
FISHING TACKLE
Filed Dec. 26, 1952
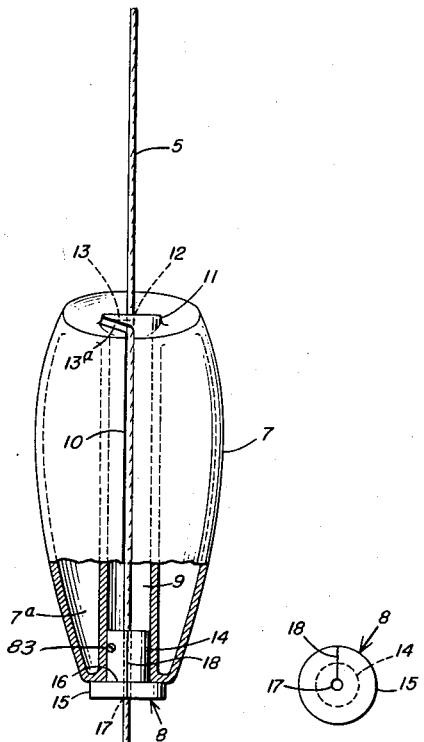
FIG. 1
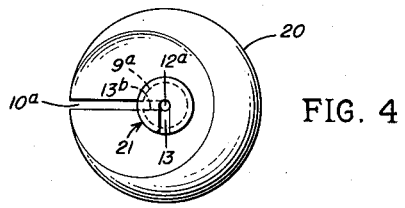
FIG. 2
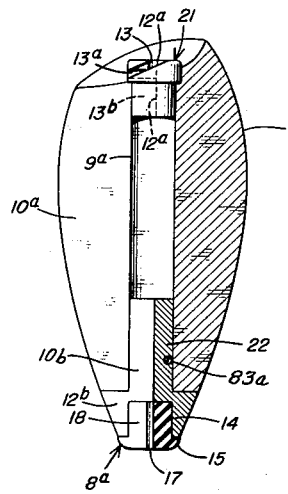
FIG. 3
FIG. 4
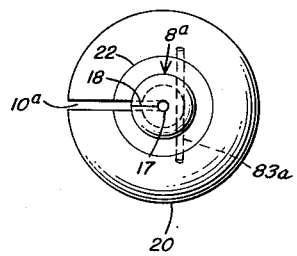
FIG. 5
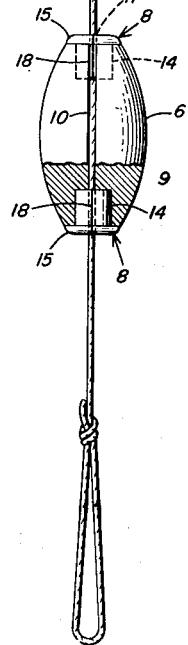
Inventor:
William J. B. Brown
By 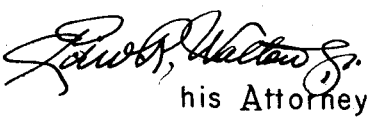
his Attorney Patented Oct. 19, 1954

2,691,842

UNITED STATES PATENT OFFICE 2,691,842

FISHING TACKLE

William Jennings Bryan Brown,
Corpus Christi, Tex.

Application December 26, 1952, Serial No. 328,049

3 Claims. (Cl. 43—44.9)

The present invention relates to improvements in floats and sinkers useful as terminal fishing-tackle and this application is a continuation-in-part of my application Serial No. 792,660 which has matured as Letters Patent No. 2,623,322 on January 2, 1953.

The improvements of this invention are more particularly applicable to floats and sinkers that are laterally attachable to and detachably removed from a fishing-line, and preferably freely-sliding thereon, by means of a side slot in the body of the float or sinker extending lengthwise of a center bore and radially through the outer surface of the body. This permits lateral insertion of the fishing-line into the bore, wherein it usually is free to slide lengthwise.

In fishing with terminal tackle which includes adjacent sliding lead sinkers and floats, especially when the latter present relatively hard and unyielding end faces of wood, plastic, metal or have plastic guide-plugs therein, the line is apt to be pinched, kinked, and otherwise subjected to frictional damage resulting from impacting contact between float and sinker. This is most apt to occur when casting, "popping" a float, or reeling in.

The object of this invention is to overcome this drawback and this is accomplished by providing a shock absorbing bumper of rubber or other like material, which is intended to be interposed between float and sinker by incorporating it in the construction of an end of each. In addition to line-pinching, an inturned ridge, or burr, is produced at the end of the sinker bore which is adjacent to the float by a violent impact between the adjacent end of the sinker and the float or by repeated impacts. Eventually, this ridge increases in extent to the point that the fishing line becomes choked and free sliding is prevented. In the meantime, however, there is constant abrading action, which may cause the line to break at a critical moment, such as when a big fish is fighting to get away. My elastic bumper will prevent any upsetting of the sinker ends, and thus is a useful adjunct to any sort of sliding terminal tackle.

With these objects in view, my invention consists in whatever is described by, or is included within the terms or scope of the appended claims.

In the drawings which illustrate the preferred embodiment of the said invention as now devised:

Figure 1 is a side elevation, partly in section, of a set of terminal tackle (minus hook) assembled on a fishing line (broken away) and which includes the preferred form of float, and sinker in accordance with my invention;

Figure 2 is a plan view of the guide-bumper when detached from Figure 1;

Figure 3 is an axial section of a cork or wooden float having a guide-plug at its upper end and a rubber bumper at its lower end;

Figure 4 is a top plan view of the float shown in Figure 3; and

Figure 5 is a bottom plan view of the float shown in Figure 3.

Referring first to the disclosure in Figure 1, the free end portion of the fishing line 5 is shown with the float-sinker combination attached thereto in their usual relative positions, the sinker 6 and the float 7 each being equipped on the facing or adjacent ends with my shock-absorbing bumper 8. The sinker and the float are each, preferably, constructed with an axial bore 9 and a radial side slot 10 extending lengthwise of the sinker and the float and from the outer surface thereof to a point where it intersects the bore 9, thus permitting quick lateral attachment and detachment of the fishing-line 5 to and from the same, as fully explained in my aforesaid co-pending application.

The float 7 of Figure 1 is, preferably, formed of plastic or similar material, or of light weight metal, with a closed air chamber 7ª to afford the required buoyancy.

At the upper end of the float 7, the wall of the bore 9 is formed with an outward prolongation 11 having a closed passage 12 therein aligned with the bore 9 and a radial slot 13 angularly offset from the side slot 10 in the float body and intersecting the passage 12. The radial slot 13 extends from passage 12 through the end and side walls of the projection 11 and communicates with the side slot 10 by means of a perimetral or circumferential slot part 13ª extending to the passage 12 with registering end communicating with the slot 10 in the float body and its other end communicating with the slot 13, thus, in effect, forming a zigzag slot for the purposes fully set forth in my aforesaid co-pending application.

Inserted into the lower end of the bore 9 of the float and into both ends of the sinker 6 is a combination fishing-line retaining guide and bumper 8 to be made of a soft resilient or elastic material, such as rubber. As shown, this guide-bumper 8 has an anchor portion 14, in the form of a complementally shaped plug extension, for insertion into the lower open end of the bore 9 of the float and an enlarged head portion 15 which presents a shoulder 16 adapted to abut the lower end of the float to prevent the protruding head from being driven into the float bore by impacting contact with the sinker which is associated with the float on the fishing line 5. The guide-bumper is provided with a central bore 17 for axial alignment with the float bore 9 and with a normally closed lengthwise slit 18 extending the full length of the anchor portion 14 and the head 15 and positioned in registration with the side slot 10 of the float. Because of the use of soft elastic material of which the bumper is made, the fishing line may be forced through the slit 18 into the bore 9 and, yet, will be retained in the bores 9 and 17 quite securely under the normal lateral stresses of fishing. The provision of a flange-like head 15 facilitates introduction of the line into the guide slit. Because the head 15 is unconfined, the portion of the slit 18 at the lower edge of the head will be more easily spread by the line than the confined portion of the slit which extends through the anchor 14. After the line has once been started into this outer portion of the slit 18, movement through the inner portion of the slit into the central portion of the bore 17 may be accomplished without difficulty.

The guide-bumper 8 is held fixedly against rotation, in its above stated position, in the bore 9 of the float 7 in any suitable manner such, for instance, as by a pin 83 extending through the float and the guide-bumper, or by cementing it in position or by tightly compressing its shank 14 into the bore with such a fit as holds it against rotation.

The combination guide-bumper 8, just described, may also be inserted in both ends of the sinker 6, as shown in Figure 1, in the manner set forth in connection with the float 7.

In Figures 3, 4 and 5 is shown a float that may be constructed of wood or cork or similar material and is provided with a central bore 9ª opened at both ends and with a side slot 10ª similar to and for the same purposes as described in connection with Figure 1. The upper end of the float 20 may be provided with any type of guide member 21 shown and described in my aforesaid co-pending application and, for the present illustration, the guide member 21 is the same as guide member 56 shown in Figure 4 of said copending application and has a central longitudinal bore or passage 12ª and a radial slot 13 and a circumferential slot 10ª connecting the radial slot 13 with the side slot 13ᵇ, which latter is in registering alignment with the side slot 10ª in the float body 20. The lower end of the float 20 is provided with a bumper 8ª which, in all respects, is similar to the combination guide and bumper 8 above described. However, if it is preferred, the guide-bumper 8ª may be fixedly inserted in the end of a plastic or lead tube 22, which is carried and fixedly held against rotation in the lower end of the bore 9ª (as by a pin 83ª, as one instance) and is formed with a longitudinal side slot 10ᵇ registering with the side slot 10ª of the float 20 and with the slit 18 in the bumper 8ª and intersecting the bore 9ª.

From the above it is manifest that the objects of the present invention have been attained by the construction above described in a cheap and facile manner.

Having described the invention and the manner in which the same is to be performed, it is to be understood that various modifications and variations may be made in the invention and that I am not to be limited to the exact form shown and described but only by the spirit of the invention and the scope of the appended claims.

What is claimed is:

1. In a fishing-line tackle device, the combination with a body element having a central open-ended line receiving bore therethrough and a side-slot therein intersecting the bore throughout its length and opening through the end and side surfaces of the element by which the body element may be readily applied and removed from a fishing line, of means for holding said body element on said line including a guide and retaining member of yieldably resilient material carried in, at least, one end of said body element and having a central passage disposed in alignment with an end of the bore in said body element to slidably receive a fishing line and to absorb the impact of another element that may be on said line, when engaged thereby, thus reducing to a minimum injury to the line and to said contacting elements, said guide member having a normally closed self-closing slit therein extending lengthwise thereof and intersecting said passage and fixedly maintained against rotation in registration with the side-slot in said body element whereby said line may be passed through said slit to and from said passage in said member and be slidably retained in said passage by the inherent self-closing action of said slit except upon a deliberate pull of said line through said slit.

2. As a fishing-line tackle device, a tackle element having a central fishing-line receiving bore therethrough to slidably receive a fishing-line therein and having a side-slot extending from its outer surface and intersecting said bore throughout its length to permit said element to be applied to and removed from a fishing-line and, further, having means at both ends of said bore and side-slot for retaining said line in said bore and arranged to permit attachment and detachment of said element from said line, said retaining means at the normally lower end of said element comprising a shock-absorbing bumper of yieldable rubber-like material having one end mounted in said end of the bore and held fixedly against rotation and projecting for a distance therefrom to receive the impact of another adjacent element that may be on said line, said bumper having a line receiving passage therethrough aligned with said bore and dimensioned so that said line is slidable therein, said bumper having a normally closed self-closing side-slit intersecting said passage throughout its length and registering with said side-slot in said element, whereby said line may be passed through said slit to and from said passage in said member and be retained in said passage by the inherent self-closing action of said slit except upon a deliberate pull of said line through said slit.

3. The combination with a fishing-line float which float has a central bore therethrough to slidably receive a fishing-line therein and having a side-slot therein intersecting said bore longitudinally throughout its length to permit attachment and detachment from a fishing-line, of a shock-absorbing guide bumper means comprising an elongated member of relatively non-yielding material having one end portion dimensioned to be inserted into and non-rotatably fixed in one end of said bore of said float and its other end to project from said end of the float and, further, having a longitudinal side-slot therein throughout its length and of a width and depth to register with and form a continuation of the side-slot of the float and to align with the bore in said float, and a bumper element of yieldable resilient rubber-like material non-rotatably fixed in the other end of said member adapted to project from the float, said bumper member having a central open-ended line-receiving passage therein and a normally closed self-closing side-slit intersecting said passage throughout its length, the side slit in the bumper element registering with the side-slot in said member and said passage in the bumper element registering with the inner portion of said side-slit in said member, whereby a line may be passed through said slit to and from said passage in said bumper element and be retained in said passage by the inherent self-closing action of said slit except upon a deliberate pull of said line through said slit.

References Cited in the file of this patent

UNITED STATES PATENTS

| Number | Name | Date |
|---|---|---|
| 522,167 | Rawlings | June 26, 1894 |
| 771,263 | McCord | Oct. 4, 1904 |
| 2,140,724 | Stefan | Dec. 20, 1938 |
| 2,527,437 | Matras | Oct. 24, 1950 |
| 2,570,293 | Vadnais | Oct. 9, 1951 |

FOREIGN PATENTS

| Number | Country | Date |
|---|---|---|
| 123,384 | Sweden | Nov. 23, 1948 |
| 935,819 | France | July 1, 1948 |